| (12) | United States Patent | (10) Patent No.: | US 9,656,352 B2 |
|---|---|---|---|
| | Gagnon, Jr. et al. | (45) Date of Patent: | May 23, 2017 |

(54) FLUX COMPOSITION FOR BRAZING

(71) Applicant: Lucas-Milhaupt, Inc., Cudahy, WI (US)

(72) Inventors: Paul Julien Gagnon, Jr., Sunderstown, RI (US); Michael Anthony Raposa, Fall River, MA (US); David Wayne Jordan, Cumberland, RI (US); Daniel J. Jossick, Exeter, NH (US); George Napolean Martin, Freedom, NH (US)

(73) Assignee: Lucas-Milhaupt, Inc., Cudahy, WI (US)

( * ) Notice: Subject to any disclaimer, the term of this patent is extended or adjusted under 35 U.S.C. 154(b) by 125 days.

(21) Appl. No.: 14/303,140

(22) Filed: Jun. 12, 2014

(65) Prior Publication Data

US 2014/0360628 A1 Dec. 11, 2014

Related U.S. Application Data

(60) Division of application No. 12/324,410, filed on Nov. 26, 2008, now Pat. No. 8,753,455, which is a continuation of application No. 11/558,400, filed on Nov. 9, 2006.

(60) Provisional application No. 60/735,323, filed on Nov. 10, 2005.

(51) Int. Cl.
| *B23K 35/362* | (2006.01) |
|---|---|
| *B23K 35/36* | (2006.01) |
| *B23K 35/365* | (2006.01) |
| *C08K 3/08* | (2006.01) |
| *C08K 5/00* | (2006.01) |

(52) U.S. Cl.
CPC ........ *B23K 35/362* (2013.01); *B23K 35/3602* (2013.01); *B23K 35/365* (2013.01); *B23K 35/3607* (2013.01); *B23K 35/3613* (2013.01); *C08K 3/08* (2013.01); *C08K 5/0016* (2013.01); *Y10T 428/2951* (2015.01)

(58) Field of Classification Search
CPC .......................... B23K 35/362; B23K 35/3602
USPC ........................................................... 148/26
IPC .................................... B23K 35/3613,35/3602
See application file for complete search history.

(56) References Cited

U.S. PATENT DOCUMENTS

| 4,301,211 A * | 11/1981 | Sloboda ............. | B23K 35/0222 |
|---|---|---|---|
| | | | 148/23 |
| 2004/0009358 A1* | 1/2004 | Scott .................. | B23K 35/0233 |
| | | | 428/469 |
| 2004/0171721 A1* | 9/2004 | Esemplare ............... | C08K 5/34 |
| | | | 524/100 |
| 2010/0139952 A1* | 6/2010 | Arora ................. | B23K 35/3613 |
| | | | 174/250 |

FOREIGN PATENT DOCUMENTS

CN 1315237 A 5/2007

* cited by examiner

*Primary Examiner* — Weiping Zhu

(74) *Attorney, Agent, or Firm* — Boyle Fredrickson, S.C.

(57) ABSTRACT

A flux coating composition may include a composition paste including an elastomer solution mixed with a flux powder or a flux paste. When the composition is heated during a brazing operation, the composition yields no metal oxides and ≤50 ppm of carbon, ash, fumes, smoke, or other by-product contaminants. The flux may include a binder with an acrylic resin and a plurality of synthetic rubber compounds.

20 Claims, 6 Drawing Sheets

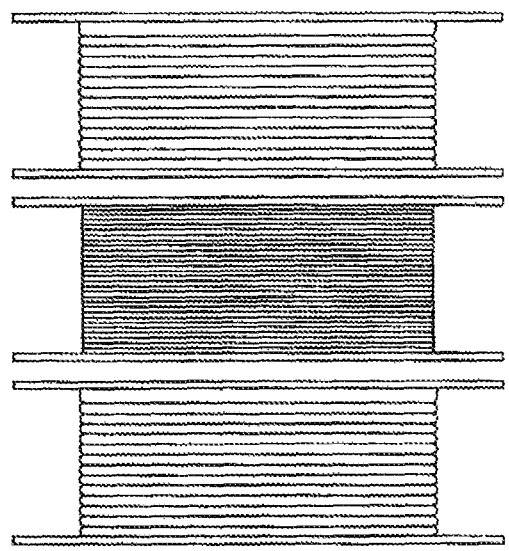

FIG. 8

| S1 | Brazing material of continuous length, with or without a microdeformation surface enhancement |
|---|---|
| S2 | Mix a flux coating composition (flux + elastomer + plasticizer + solvent) |
| S3 | Apply a layer of said flux composition to the surface of a brazing material |
| S4 | Apply in-line radiant heat/convection drying to flux coated brazing material |
| S5 | Spool, coil or wind continuous length flux-coated brazing material |

FIG 9

FLUX COMPOSITION FOR BRAZING

CROSS-REFERENCE TO RELATED APPLICATIONS

This application is a divisional application and claims priority to now pending U.S. application Ser. No. 12/324,410, filed Nov. 26, 2008, which claims priority on U.S. application Ser. No. 11/558,400, filed Nov. 9, 2006, which claims priority on U.S. Provisional Application No. 60/735,323, filed Nov. 10, 2005, the entireties of which are herein incorporated by reference.

BACKGROUND OF THE INVENTION

1. Field of the Invention

This invention relates generally to brazing material and brazing fluxes, and more specifically to flux-coated or flux-cored brazing material.

2. Related Art

Various methods are known for joining metal components, including mechanical bonding, adhesive bonding, soldering, welding and brazing. Although brazing, soldering and welding are similar, there are important differences. Soldering is generally performed at lower temperatures (below 450 degrees Celsius), but does not produce as strong a joint. Welding is a high-temperature process in which the two metals to be joined are actually melted and fused together. Brazing is a method of joining two pieces of metal together with a third, molten filler material. Welded and brazed joints are usually at least as strong as the metals being joined. The welding process is preferable for applications which benefit from or require highly localized, pinpoint heating. Brazing is particularly useful in more difficult applications, such as joining of larger areas, linear joining, and joining metals or alloys having different melting points.

In brazing, the components to be joined are assembled so that there is a small gap, the so-called "joint gap," between their mating surfaces. The components are heated (or at least heated in the region of the proposed joint) to a temperature above the melting point of the brazing material but below the melting point of the components to be joined (or, in the case of two or more components made of dissimilar metals or alloys, below the lower or lowest inciting point of any of the components to be joined). Heat may be provided by torch, furnace, induction or any other heating method that may used in joining components. During joining, the brazing material melts, wetting the surfaces of the components being joined, and is drawn or held in the joint gap by capillary action. Upon cooling, the brazing material solidifies, forming a metallurgical bond between the surfaces of the joined components.

Brazing may be used to join metal-to-metal, alloy-to-alloy, metal-to-alloy, metal-to-ceramic, alloy-to-ceramic, or ceramic-to-ceramic. Ceramic components may be coated with metals or alloys prior to brazing. Brazing materials frequently melt at temperatures above 425 degrees Celsius. Brazing materials may be comprised of one or more base metals, or eutectic mixtures or alloys thereof, such as aluminum, copper, gold, platinum, silver, tin, phosphorous, palladium, nickel, manganese, zinc, cadmium, chromium, boron, silicon, iron, carbon, sulphur, titanium, zirconium, tungsten, cobalt, molybdenum, niobium, selenium, lead, palladium, bismuth, beryllium, lithium and indium; other metals, metal alloys or minerals may also be used. A brazing material may be referred to as "brazing alloy," "brazing material," "brazing compound," "brazing metal," "brazing filler" or "filler metal." Throughout this application, any and all materials, elements, compounds or compositions used as brazing materials are referred to herein as "brazing material" or "brazing materials."

It is well known in the art that it is necessary to prepare the surfaces of the components to be joined prior to applying the brazing material, so that the brazing material adheres to the surfaces to be joined. When components or surfaces are joined by brazing, it is preferable that both the brazing material and the joint area of the component surfaces are free from oxide films that may degrade the strength of the brazed joint. This may be done by carrying out the brazing operation in a reducing atmosphere, such as in a furnace. However, when brazing is done in air a flux composition or a flux compound (referred to as a "flux," "brazing flux" or "flux cover") is used to eliminate existing oxides or inhibit oxide films from forming on the brazing material and the surfaces of the components being joined. Thus, the flux must be capable of removing metal oxides at pre-selected brazing temperatures while remaining substantially inert with respect to the brazing material. Since fluxes are usually reactive (e.g., capable of removing oxides), the flux should be transformed to its molten state at or near the melting temperature of the brazing material. The flux is first applied to the surfaces of the components to be joined and is then activated to remove oxides and clean the surfaces by the application of heat at or around the joint.

Although the principal purpose of the flux is to eliminate or inhibit the oxidation (formation of oxides) of the brazing material and of at least selected areas of the surfaces of the components being joined, the flux also must melt and flow at a temperature below the melting point of the brazing material, wet the surfaces of the components and brazing material, facilitate the wetting of the components by the molten brazing material, and be capable of being displaced by molten brazing material.

Fluxes generally comprise a eutectic mixture of borates (including, without limitation, fluoroborates), fluorides (including, without limitation, bifluorides), chlorides, or salts thereof and one or more of the alkali metals, and are typically highly corrosive and hygroscopic in nature so that the flux adequately cleans the surfaces to be joined. Non-hygroscopic and noncorrosive flux compositions are known in the art. Known fluxes include those described in U.S. Pat. Nos. 6,395,223, 6,277,210, 5,781,846 and 4,301,211. The entire content of each of these four patents is hereby incorporated by reference. Fluxes in the form of a liquid, solid, powder, slurry or paste may be applied to a brazing material or components to be joined.

Various methods are used to apply flux to the joint area and to the external surfaces of the components to be joined. Usually, the flux is applied to the surfaces to be brazed and the surfaces are heated to allow the flux to melt, flow and coat the surfaces. It is well known for the brazing flux in the form of a powder or paste to be applied to the joint area when the components are cold. The joint area is then heated until the brazing temperature is reached, and then the brazing material is applied. Various methods are used to apply brazing material to a joint, including, without limitation, insertion of the brazing material (in the form of a rod, wire, strip, disk, sheet, sheath or other form factor) into the entirety or a portion of the joint gap, upon which heat from the adjacent components begins to heat and thereby melt the brazing material. Alternatively, brazing material may be positioned at the mouth of the joint gap by melting the end portion of the brazing material.

Linear brazing materials in the form of a "brazing rods" or "brazing wires" are well known in the art and include non-circular linear forms such as sheets or strips. A brazing rod is a fixed length brazing material generally of approximately 20 inches or less. Linear brazing materials may be formed into circular or quasi-circular shape (e.g., oval, elliptical, hexagonal, semi-circular or "U"), loose coils, flat shapes (e.g., disks), conicals, saddles, bowls or other custom shapes. A brazing wire is a brazing material of continuous length. For purposes of this application, "continuous length" means a length greater than approximately twenty inches. Neither a bare brazing rod nor a bare brazing wire contain a flux core or flux coating.

Due to the corrosive, hygroscopic nature of many fluxes and the residual or excess flux that results from various methods used to apply the flux, in many applications it is necessary or desirable to remove any residual flux or flux residue from the joined parts in order to prevent or limit corrosion of the joined components. The removal of residual flux increases the overall product cost due to the additional cleaning steps and the cost to dispose waste resulting from the cleaning process.

Flux-coated brazing rods and flux-cored wires have been developed to eliminate the separate steps of applying the flux to the joint and removing and disposing of residual flux, thereby reducing the cost of manufacture. Flux-coated brazing materials have flux pre-applied to an exterior or exposed surface of the brazing material. Flux-cored brazing materials have flux pre-applied to on an interior surface, such as a channel, core, groove or other hollow form or cavity within a brazing material. Flux-coated and flux-cored brazing rods or wires may be made by first mixing a brazing flux composition, for example with water or an organic solvent or a liquid or semi-liquid binder to form a flux paste composition, a solid flux composition or a flux powder composition (such as by milling, crushing or pulverizing a solid flux). Binders commonly used include acrylic resins (e.g., 1-methoxy-2-propanol-acetate) and synthetic rubber compounds (e.g., butylpolybutadiene, polyisoprene, butadienestyrene and polyisobutylene). The flux paste may be applied to a brazing material using an extrusion press to extrude a concentric coating of the flux paste composition of a desired thickness onto the brazing rods and the coated rods are then baked to harden the flux coating.

Alternatively the flux paste or powder may be deposited within a core, notch, groove, hole, crevice, cavity or other hollow area within a brazing material, to form a brazing material form, e.g. a flux-cored wire or sheath of brazing material, for example as described in U.S. Pat. Nos. 5,781,846 and 6,395,223, owned by Omni Technologies Corporation. In flux-cored and flux-coated brazing materials, the surfaces of the components to be joined are heated and the flux-cored brazing material form is brought into contact with the heated surfaces, causing the flux to melt and flow and thereby causing the brazing material to melt and flow.

Continuous length flux-coated brazing materials are not currently known in the art. In many brazing applications, the brazing process is performed in a limited physical space and it is often necessary or desirable to bend, curl, angle or otherwise deform a linear brazing material (or to have a brazing material that is pre-formed in a bent or deformed shape) so that is may be appropriately positioned with respect to the joint gap and the components to be joined. A disadvantage of currently available flux-coated and flux-cored brazing rods or wires made in the above-described manner is that the fluxes are relatively brittle. Thus, when known flux-coated or flux-cored brazing materials are curled, bent or deformed (e.g., during transit, storage, handling or use) the flux coating or flux core easily cracks, fractures, peels or chips so that it becomes a non-continuous flux and portions of the flux coating or flux core may detach from the rods or wires. When the flux coating or flux core becomes detached and non-continuous, it loses its usefulness and effectiveness because it may produce a joint having less mechanical bond or strength.

A further disadvantage of known flux-coated and flux-cored brazing materials is that the brittle flux-coating or flux-core does not allow the brazing material to be coiled, spooled, wound or manufactured into rings or other form factors that may be formed from the flux cored or coated wire or rod into a substantially circular, oval or elliptical shapes. When the brazing material is formed into a circular, oval or elliptical shape it causes the brittle flux coating or flux core to crack, peel, fracture (which permit moisture to enter the flux) and possibly detach from the brazing material. Thus, the length of the rod or wire is limited to shorter lengths (generally less than 20 inches) and non-continuous forms that cannot be transported and handled in spooled, coiled, wound, rolled form or produced in other forms capable that permit the brazing material to be packaged, transported, stored or used in compact or compressed form.

Another disadvantage is that current flux coating processes only lend themselves to coating brazing material lengths less than or equal to approximately 20 inches, such as rods, due to the required post-cure step of baking the coating to cure or harden the flux—a step necessary to impart durability to the flux coating. The currently available form of flux coated brazing materials is limited to a rod of approximately 20 inches or less, thus limiting the usefulness of the length and causing waste, as the last inch of the rod is generally discarded as being too small to effectively use.

Accordingly, there is a need for a coated or cored brazing material that may be bent, curved, angled, curled, conformed or otherwise deformed in the brazing process. There is also a need for a continuously coated or cored brazing material of a continuous length that has a durable and flexible flux composition so that it may be spooled, coiled, wound, conformed, made or deformed into other circular or quasi-circular, non-linear or other form factors (e.g. rings, disks or ribbons). There also is a need for a durable, flexible flux composition that effectively prepares the surfaces to be joined, is clean burning and that may be deposited on the surface or core of a brazing material. Additionally, there is a need for a method of preparing a flux-coated or flux-cored brazing material that does not require post-cure heating or baking, so as to reduce manufacturing costs. There is also a need for a flux-coated or flux-cored brazing material that will provide for a wide selection of brazing base metal or alloy compositions and may include coated brazing materials having customized base metal properties. The present invention is directed to overcoming one or more of the problems set forth above.

BRIEF SUMMARY OF THE INVENTION

Consistent with the foregoing and in accordance with the invention as embodied and broadly described herein, a brazing material with a continuous length layer of elastomer containing a flux is described in suitable detail to enable one of ordinary skill in the art to make and use the invention.

It is an object of the invention to provide a flux-coated brazing material that is easily utilized and able to conform to the contours of many joining surfaces. It is an alternative object of the present invention to provide a flux composition that, when applied as a coating to brazing materials, has sufficient elasticity to prevent, limit or minimize cracking, peeling, chipping, fracturing or detachment of the flux when the brazing material is bent or conformed to the contours of or to be positioned about a brazing joint.

A further alternative object of the invention is to provide a flux composition that has suitable surface hardness when applied as a coating or core so as to provide durability during transit, handling, storage, use and disposal. It is a further alternative object of the invention to provide a flux-coated or flux-cored brazing material that has a durable and flexible flux core or coating and is of a continuous length. It is a further alternative object of the invention to provide a process for coating or coring a semi-continuous length, continuous length, quasi-circular, nonlinear or other form or shape of brazing material whereby a post cure or baked hardening is not required. It is a further alternative object of the invention to provide a method of using a continuous length of flux-coated brazing material in a brazing process.

Yet another alternative object of the invention is to provide a process for surface preparation of brazing material to provide an interlock or enhanced binding surface for coating or coring a brazing material with a flux.

A further alternative object of the invention is to provide a flux composition suitable for continuous coating or coring of a substantially round, oval, elliptical cross-section form (such as a wire, tube or cable) or of substantially flat surfaces or cross-section (such as a strip, sheath or sheet).

Another alternative object of the invention is to provide a method of manufacturing a continuous length of flux-coated brazing material that may be wound, coiled or spooled. In alternate embodiments, the method includes spooling or coiling to facilitate automatic wire feed or manual brazing applications.

Still another alternative object of the invention is to provide a method of manufacturing a continuous length of flux-coated brazing, material that may be fed into automatic, semi-automatic, or manual forming equipment to make flux-coated brazing rings, flux-coated washers, flux-coated shims or other flux-coated brazing pre-forms.

Another alternative object of the invention is to provide a method of brazing using a continuous length of flux-coated brazing material that is heated in torch, induction, furnace, or other common heating method used for joining metals.

These aspects are merely illustrative of the innumerable aspects associated with the present invention and should not be deemed as limiting in any manner. These and other aspects, features and advantages of the present invention will become apparent from the following detailed description when taken in conjunction with the drawings. Although methods and materials similar or equivalent to those described herein may be used in the practice of the present invention, suitable methods and materials are described below. In addition, the materials, methods and examples described herein are illustrative only and are not intended to be limiting in any manner.

BRIEF DESCRIPTION OF THE DRAWINGS

Preferred exemplary embodiments of the invention are illustrated in the accompanying drawings in which like reference numerals represent like parts throughout, and in which:

FIG. 8 illustrates a continuous length, dyed flux-coated brazing material; and

FIG. 9 is a flow chart describing the method of preparing a flux-coated brazing material of continuous length.

DETAILED DESCRIPTION OF THE INVENTION

Figure 1:
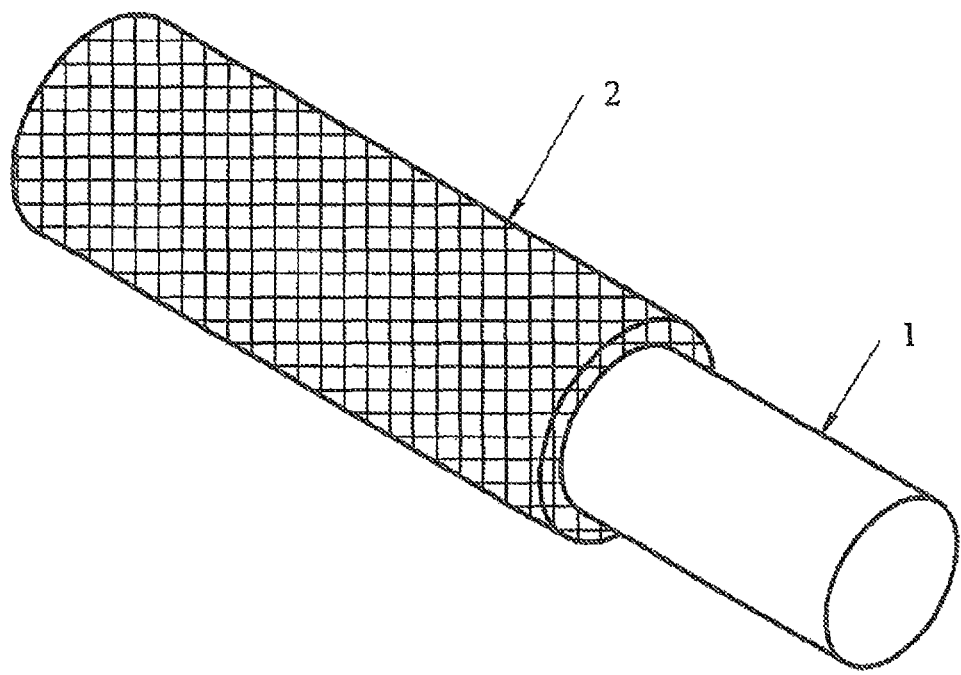
FIG. 1 illustrates a partially formed flux-coated brazing material.

Applicants have discovered a flux composition suitable for coating or coring a brazing material 1 (when used as either a coating or a coring material the flux is referred to herein as a "flux coating composition") and that retains both sufficient hardness or toughness (durability) and sufficient flexibility (elasticity) so that the coated or cored brazing material 1 may be bent, conformed, or deformed as needed to enhance the usefulness and effectiveness of the brazing. The flux coating composition 2 of the present invention preferably utilizes a clean burning binder that yields a brazed joint substantially free of impurities or joint contamination.

Through extensive experimental investigation Applicants have discovered that a flux coating composition 2 should preferably have at least one of the following characteristics or properties:

(a) The elastomer solution (e.g., the elastomer and any solvent used with the elastomer) when mixed with a flux powder or flux paste produces a composition paste which, upon pressure die coating onto a brazing material 1 is capable of producing a smooth, dense, continuous coating or coring with sufficient green strength to permit the freshly coated or cored brazing material 1 to be coiled, wound or spooled. Preferably, the elastomer has at least one of the properties described in Table 6 below.

(b) The elastomer is such that when freshly made the composition paste made from the flux powder or flux paste and the elastomer solution retains a workable consistency for a time sufficient to permit the flux coating composition 2 to be applied;

(c) The elastomer and any other component of the flux coating composition 2 that remains on the brazing material 1 when they are ready for use does not interfere with the functioning of the brazing flux during the brazing process. Specifically, the elastomer and any other component remaining in the flux coating composition 2 should have good burn-off characteristics, that is, it or they would not produce excessive quantities of carbon, ash, fumes, smoke or by-product contaminants when a flux-coated or flux-cored brazing material 1 is heated. Most preferably, it or they would burn off or volatilize substantially completely without leaving behind any material amount of solid residue (e.g., less than or equal to 50 ppm carbon, ash or other residue);

(d) The elastomer is such that the composition of flux powder or flux paste and elastomer will be capable of producing a flux coating composition 2 which, after drying, is sufficiently hard so as to withstand handling without post-cure baking or hardening;

(e) The elastomer is such that the flux coating composition 2 containing flux powder and elastomer would have the above desirable features (a) through (d) in addition to having a sufficiently high flux content to enable brazing operations to be effective. Most preferably the flux component should be more than 30 wt. % of the flux coating composition 2.

(f) The flux component of the flux coating composition 2 is of a particle size distribution at least 140 mesh solids, preferably between approximately 200 and approximately 325 mesh solids, in order to facilitate homogenization and green strength of the dried coating.

Figure 7:
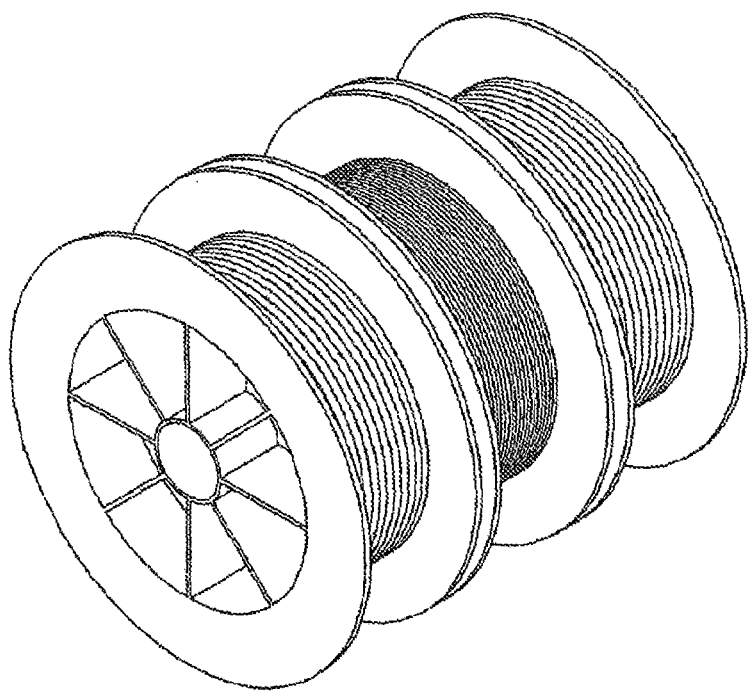
FIG. 7 illustrates a flux-coated brazing material having a colored flux coating composition in various pigmented.

(g) In addition to one of the other characteristics or properties listed above, the flux coating composition 2 is capable of being colored with pigment or dye. FIG. 7 or 8.

The flux-coated brazing material 1 (i.e., the brazing material 1 following application of the flux coating composition 2) preferably has at least one of the following characteristics or properties:

(h) A flexible and durable flux coating composition 2 that does not crack, peel, fracture, chip, break or otherwise become non-continuous if the brazing material 1 is bent, curved, conformed or otherwise deformed during normal packaging, shipping, handling, storage or use.

(i) An engineered flux coating composition thickness of between 0.0005 and 0.035 inches, preferably to +/−0.001 of an inch, to provide optimal brazing performance.

(j) An engineered flux coating composition thickness which yields low flux residue or low or no metal oxides upon completion of brazed joint.

(k) Is clean burning leaving behind no carbon or ash deposits during or after completion of brazing.

(l) An engineered coated product which can be made into wire, strip, preform, ring and other non-linear form factors.

(m) A brazing material 1 having a base metal or alloy composition of at least one of the elements of Table 4, preferably copper, silver, phosphorous, nickel, zinc, tin, cadmium, manganese.

(n) One or more of the properties described in Table 5 below.

The preferred flux coating composition 2 of the invention has properties (d) and (f) specified above and most preferably one or more or all of the remaining properties (a) to (c), (e) and (g). The preferred flux-coated or flux-cored brazing material 1 of the invention has properties (h) and (l), and most preferably one or more of the remaining properties (i) through (n).

Applicants have discovered that one or more of the above properties (a) to (g) are possessed by such flux coating compositions 2 having elastomers of relatively high molecular weight, such as aliphatic polycarbonates and possibly others of the compositions described in Table 1, and certain plasticizer compounds (including, without limitation, those plasticizers identified in Table 3). The addition of a plasticizer enhances the flexibility, adhesion, surface durability and toughness of the flux coating composition 2. For purposes of the invention, "high molecular weight" means a weight of greater than 50,000 daltons; preferably a high molecular weight is between approximately 150,000 and approximately 500,000 daltons. Typical of these polycarbonates are poly(alkylene carbonate), poly(propylene carbonate) and poly(ethylene carbonate). The Aliphatic Polycarbonates (in a suitable solvent) may be used on their own with a flux to make a flux coating composition 2. Alternatively, aliphatic polycarbonates, preferably polypropylene carbonate) or poly(ethylene carbonate) or poly(alkylene carbonate) may be combined with one or more plasticizer compounds and a flux. Most preferably, the elastomer is the poly(alkylene carbonate) of U.S. Pat. No. 6,248,860, winch is incorporated herein. A suitable solvent is DE Acetate although this is, of course, by no means the only solvent that maybe employed. Additional high molecular weight elastomers believed to be suitable for the invention are described in Table 1. Additional solvents believed to be suitable for the elastomer and/or flux are described in Table 2. Additional plasticizers believed to be suitable are described in Table 3. Other solvents or plasticizers may also be used as appropriate.

Although the flux coating composition 2 may be made with any flux, the preferred flux coating composition 2 is produced by formulation of a non-hydroscopic flux or non-corrosive flux, such as described in U.S. Pat. No. 6,395,223 owned by Omni Technology Corporation (e.g., potassium fluoroborate flux complex). Preferably, the flux is milled to a fine particle distribution of greater than or equal to approximately 200 mesh solids, preferably between 200 and 350 mesh solids. The flux is then mixed with an elastomer (also referred herein as a "binder"), and more preferably with a binder and a plasticizer. Preferably, the flux coating composition 2 is formed as predetermined ratios with the following other ingredients:

| | |
|---|---|
| Non-Hygroscopic Flux | 30-50% by weight |
| a binder from TABLE 1 | 10-30% by weight |
| a solvent from TABLE 2 | 30-50% by weight |
| a plasticizer from TABLE 3 | 1-20% by weight |

The flux coating composition 2 is then mixed to a concentration of approximately 60% by weight solids in preparation for coating application to the surface of the brazing material 1.

An alternate embodiment of the flux coating composition 2 suitable for a strong, durable hard coating with a suitable flexibility for spooling (e.g., wire, tube, cable, strip or sheet) is as follows:

1-3% by weight plasticizer (preferably acetyl tributyl citrate);

18-22% by weight aliphatic polycarbonate (preferably poly(alkylene carbonate)) as previously discussed;

38-45% by weight solvent (preferably DE Acetate); and 28-35% by weight brazing flux powder (preferably the flux described in U.S. Pat. No. 6,395,223 or 6,277,210).

A flux coating composition 2 providing a somewhat more flexible coatings on coated brazing materials 1 for producing rings and pre-forms is:

3-5% by weight plasticizer (preferably acetyl tributyl citrate);

25-30% by weight aliphatic polycarbonate (preferably poly(alkylene carbonate) as in U.S. Pat. No. 6,248,860) as previously discussed;

32-40% by weight solvent (preferably DE Acetate); and 28-35% by weight brazing flux powder (preferably fluxes described in U.S. Pat. No. 6,395,223 or 6,277,210).

For flux coating composition 2 having a harder (more durable) coating, an aliphatic polycarbonate (preferably poly(propylene carbonate) or other elastomer, and most preferably poly(alkylene carbonate)), having a high molecular weight at the higher end of the "high molecular weight" range is preferable, most preferably in the range of between approximately 150,000 daltons and approximately 500,000 daltons, would be used with glass transition temperature greater than 40 degree. C.

Any of the currently available wide range of brazing materials 1 and brazing fluxes may be used for the purpose of this invention. However, the use of a non-hygroscopic, non-corrosive flux of U.S. Pat. Nos. 6,395,223 and 6,277,210 is preferred.

It should be noted that continuous coating of wire is common in the electrical and electronics industries where elastomers are used as insulators or to protect the wire core from corrosion or other environmental conditions. Elastomeric flux coatings known in the brazing arts must be subjected to post cure drying, heating or baking to harden the coating, and thus such coatings are currently only applied to brazing rods. The extra process of drying, baking or heating limits the brazing materials 1 that may be coated to rods and shorter lengths because continuous-length product, while still having a tacky coating, could not be readily handled, stacked and stored during the post-cure drying or baking or heating process.

In contrast, the flux coating composition 2 of the present invention, when applied to brazing material 1 in accordance with the method taught herein, does not require post-cure air drying, heating or baking. Instead, the coating dries to sufficient hardness during the process of forming the flux-coated brazing material 1 according to the method described herein.

It should also be noted that, in conventional brazing operations carried out under a flux cover, different fluxes are used depending on the composition and melting point of the brazing material 1 and on the composition of the components to be joined. The same factors govern the composition of the flux used in the production of flux-coated brazing material 1 rods. Similarly, these factors also govern the composition of the flux and the brazing materials 1 used in the present invention with respect to a particular brazing application.

An embodiment of the present invention comprises flux coating composition 2 as applied to any brazing material 1, and preferably brazing materials 1 of silver, copper, phosphorus, tin, zinc, nickel, cadmium, manganese, and alloys thereof. Such metals and alloys are well known in the art and are commercially available (for example, such alloys are currently sold under the trademark SILVALOY® by Wolverine Joining Technologies, LLC) coated with a mix containing a potassium borate/potassium fluoroborate flux as described in U.S. Pat. Nos. 6,277,210 and 6,395,223 (commercially available and sold under the registered trademark SILVACOTE™ available from Wolverine Joining Technologies, LLC).

In another embodiment of the invention, brazing material 1 is prepared for coating or coring by treating or enhancing the brazing material 1 surface in a manner to create an abrasion, scratch, perforation, scar or other defamation, preferably a microdefamation of between approximately 10 to 40 microinches (0.00001 to 0.00004 inches), to facilitate a mechanical bond between the brazing material 1 surface and the flux coating composition 2. The mechanical bond functions to receive and secure the flux coating when it is applied to the surface of the brazing material 1. For round wire, defamation may be performed utilizing a rotary straightener (e.g., such as that made by EMS, Bristol Conn.) and replacing the rotary inserts with a hard or hardened material capable of scratching, scaring or causing other abrasion to the surface of a brazing material 1, for example, without limitation, molded fibrous material or laminate having a heat-hardened binder (e.g., Micarta® [a registered trademark of International Paper Company], epoxy, epoxy glass, melamine and phenolic laminates), diamond, sapphire, carbon, steel or any other mineral, element, composition or material that is harder than the brazing material 1 surface to be enhanced. This process functions to straighten the wire for coating in addition to scarifying the surface with a rotary surface enhancement that functions as a micro-lock to secure the flux coating. Flat surfaces may be prepared using MD Technology of Wolverine Tube, Inc., as described in U.S. Pat. No. 5,775,187 which is incorporated herein. Alternatively, other methods of imparting a surface enhancement on a brazing material 1 include, without limitation, sand or grit blasting, wire brushing, roll forming, and die drawing.

Figure 2:
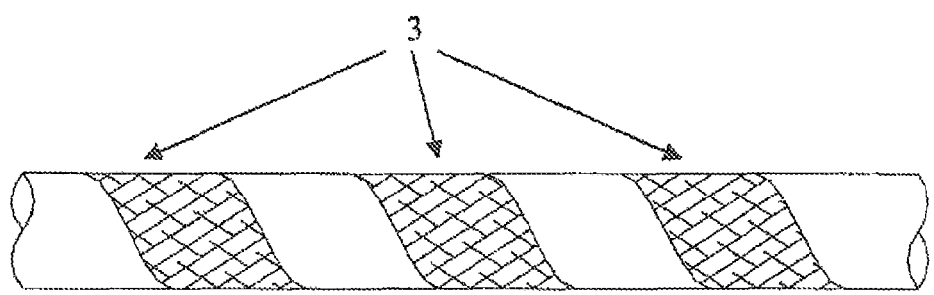
FIG. 2 illustrates a brazing material having a surface micro-deformation.
Figure 3:
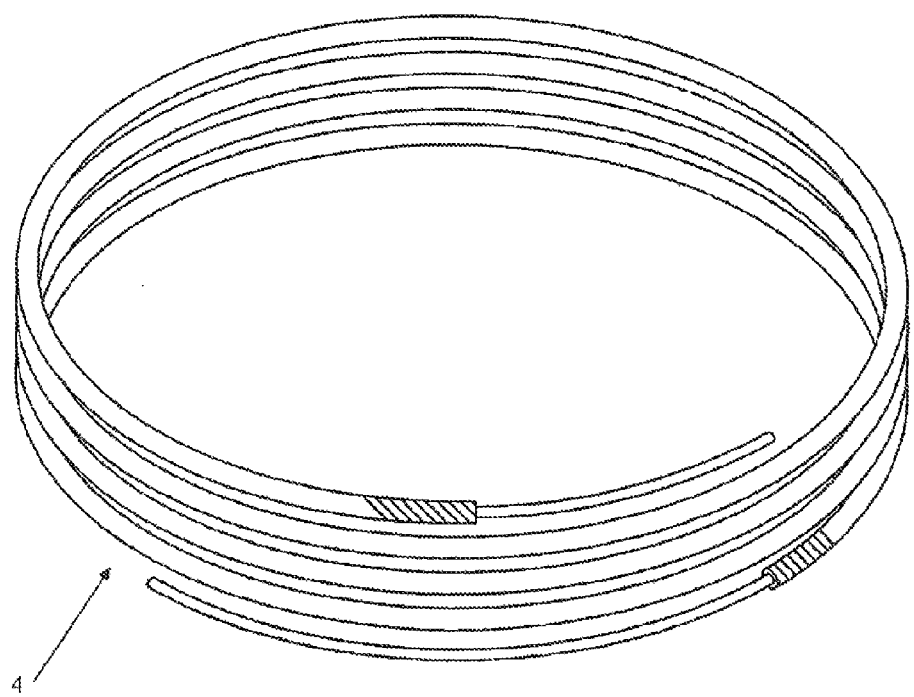
FIG. 3 illustrates a continuous length flux-coated brazing material.
Figure 4A:
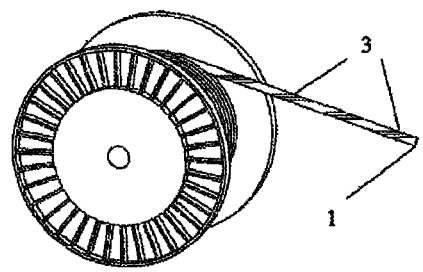
FIGS. 4A-4G each illustrate the process of making the continuous length flux-coated brazing material.
Figure 4B:
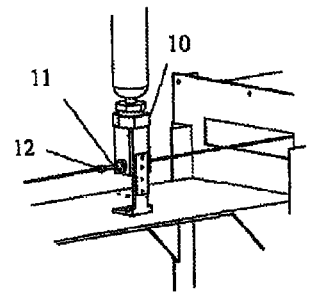
Figure 4C:
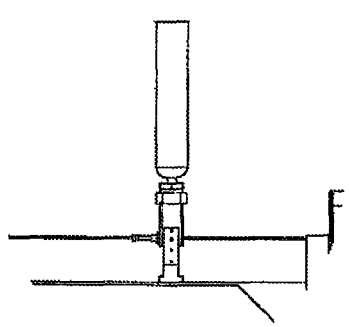
Figure 4D:
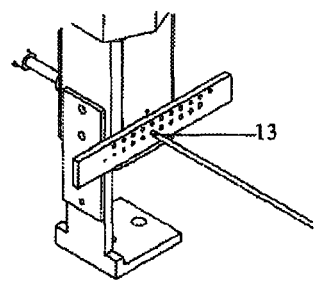
Figure 4E:
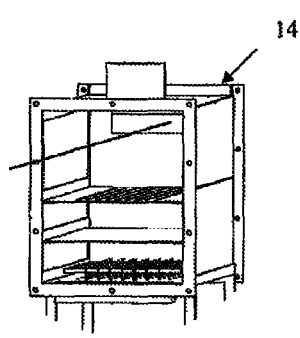
Figure 4F:
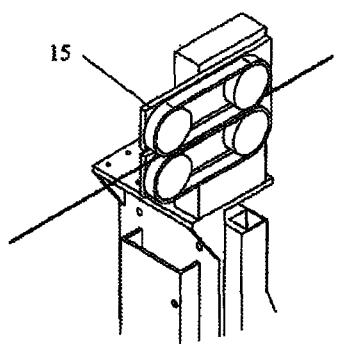
Figure 4G:
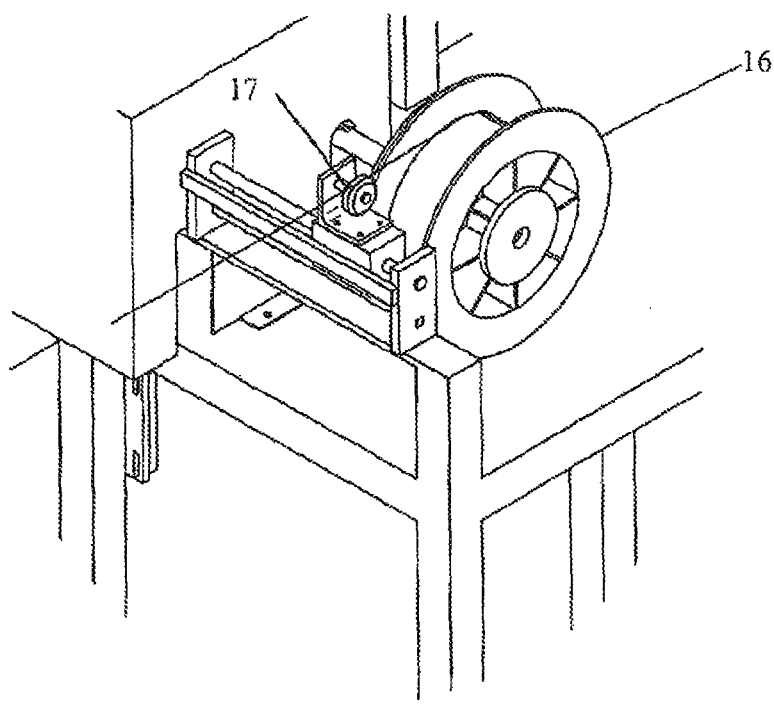
Figure 6:
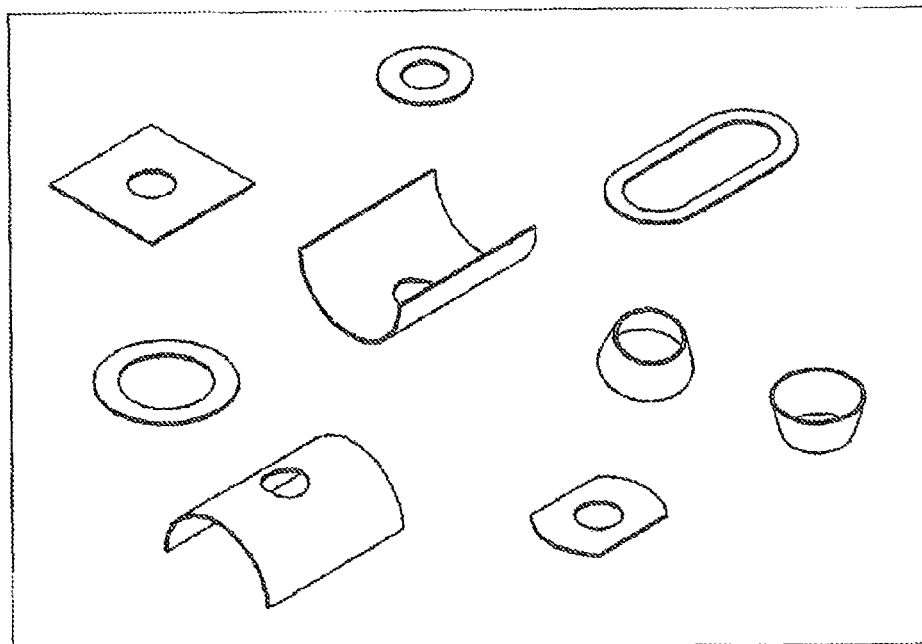
FIG. 6 illustrates various preformed shapes made from the continuous length flux-coated brazing material.

FIG. 4A through FIG. 4G illustrate the progressive process preferred by the inventors for coating brazing material 1 with the flux coating composition 2 of the present invention. The brazing material 1 of the illustration in FIG. 4A comprises a wire of brazing metal, such as a metal alloy, that has undergone a process to create microdeformation surface enhancement (3 in FIG. 2). The brazing material 1 (brazing wire in this case) is fed through a pressurized coating reservoir 10 filled with the prepared flux coating composition. Brazing wire enters the reservoir through an entrance guide 11 that can be such as capillary medical tubing or other tube or conduit 12 that is slightly larger than the diameter of the brazing wire. Once the brazing wire exits the entrance guide 11 it comes in contact with the flux coating composition 2 within the reservoir, and then exits through die orifice 13 (in FIG. 4D) that is of prescribed diameter larger than the wire to yield a specified coating thickness. To facilitate proper uniform application of the flux coating composition 2 and to accelerate drying, the flux coating composition 2 is heated to a temperature of between 25 degrees and 150 degrees Celsius, preferably between approximately 150 degrees and 220 degrees Fahrenheit (65 degrees-105 degrees Celsius) and pressurized to between 5-40 pounds per square inch ("psi") at the coating reservoir prior to application. Coating thickness is regulated through an adjustable die orifice 13 as illustrated in FIG. 4D and through regulation of the applied pressure. Once the brazing wire exits the application reservoir, the coated brazing wire enters a drying chamber 14 FIG. 4E consisting of both radiant and convection tunnel drying. Drying may range between 100 degrees and 300 degrees Celsius, with optimal drying temperatures range from 250 degrees-400 degrees Fahrenheit (120 degrees-205 degrees Celsius). Coated brazing wire is supported through the drying ovens under tension from a caterpillar belt drive 15 established at the end of the process line FIG. 4F such as a Witles Albert model NAK 100 transporter with Linatex material type belt, which regulates the speed of the coating and drying process. Coated brazing wire can then be directly level layer wound onto spools 16 (in FIG. 4G) utilizing equipment such as Hammond Engineering Spooler Machine with Amacoil/Uhing traversing wire guiding mechanism 17, or cut into discrete lengths or coiled to other loose coil form factors shown generally by reference numeral 4 FIG. 3. The flux coating composition 2 of the present invention may also be used to coat forms other than brazing wire, such as strip and other continuous forms and other shapes of brazing materials 1. Spooled or coiled flux coated brazing material 1 may be utilized on automatic wire or strip feed brazing operations. It may also be utilized on automatic forming equipment for manufacturing brazing rings, washers, shims or other brazing pre-forms such as those depicted in FIG. 6. Alternatively, the flux coating composition 2 may be applied after the use of such forming equipment.

As illustrated for wire, the flux coated brazing material 1 includes a solid wire core surrounded by a flux coating FIG. 1 to a coated ratio by weight of 5-20% coating. This and similarly shaped flux coated brazing materials 1 facilitate ease of brazing as the flux coated brazing material 1 can be formed into a plurality of desired shapes and sizes and may be easily positioned over or with a joint or surface to be brazed. The application of heat to the flux coating composition 2 causes the binder to decompose well before the melting point of the flux. This allows the flux to melt uninhibited just prior to the melting point of the solid metal core which improves alloy flow and minimizes oxides which form during the heating process. Through use of a clean burning binder, brazing may be accomplished with little or no residual ash, carbon or impurities. Additionally the pre-engineered flux coating composition provides for the proper amount of chemical flux within the matrix of the flux coating composition 2 to provide the required fluxing action without leaving behind unreacted glasses of the potassium fluoroborate compounds, yielding a cleaner finished brazed joint.

Yet another embodiment of the invention is a method of manufacturing a continuous length coated brazing material 1, comprising the steps of providing a brazing material 1 form of continuous length, providing a flux coating composition 2, applying a coating of said flux coating composition 2 to a surface of said brazing material 1 form; and in-line drying the flux coated brazing material 1. In alternate embodiments, the brazing material 1 is treated to have a surface enhancement before the flux coating composition 2 is applied. In yet another embodiment of the method, the flux coated brazing material 1 is spooled, coiled or wound after it is dried.

In another embodiment of the invention, there is provided a method of brazing at least two components, comprising the steps of placing at least two components in close proximity to create a Joint gap, providing a flux coating composition 2 as described herein, providing a brazing material 1, applying said flux coating composition 2 to said two components or to said brazing material 1, heating the coated components or coated brazing material 1 to a preselected brazing temperature, and bringing the components and brazing material 1 in close proximity so that the brazing material 1 becomes molten, wets the components and flows into the joint gap.

Another embodiment provides a method of brazing at least two components with a continuous length or non-linear flux-coated brazing material 1, comprising the steps of providing at least two components in close proximity to create a joint gap, providing a continuous length or non-linear flux-coated brazing material 1 as discussed herein, heating the two components or flux-coated brazing material 1 to a preselected brazing temperature, and bringing the two components and flux-coated brazing material 1 in close proximity so that the flux coated brazing material 1 becomes molten, wets the two components and flows into the joint gap.

A method is also provided for preparing a flux-coated brazing material 1 as shown in FIG. 9 comprising the steps of preparing a flux coating composition 2 comprising a flux component mixed with a binder from TABLE 1, a solvent from TABLE 2, and plasticizer from TABLE 3 in proportionate ratios to constitute proper performance of the coating, preparing a brazing material 1 having a surface enhancement, depositing the flux coating composition 2 onto the brazing material 1 surface in a pressurized and heated reservoir chamber, to create a coating ratio of between 5-20% flux by weight, and processing said flux coated brazing material 1 longitudinally through a tunnel drying oven consisting of both radiant and convection drying.

In alternate embodiments, the flux coating composition 2 comprises a clean burning binder which decomposes to carbon dioxide and water, the brazing material 1 is a wire having a diameter of between approximately 0.005-0.200 inches, the flux-coated brazing material 1 comprises approximately 80-95% metal and approximately 5-20% flux coating composition 2, the brazing material 1 base metal is of various alloy compositions of Cu, Ag, P, Ni, Zn, Sn, Cd, Mn or any of the brazing fillers described in Table 4, and the flux coating composition 2 is applied in a uniform controlled coating thickness of flux to a tolerance of +/−0.001 of an inch.

Figure 5:
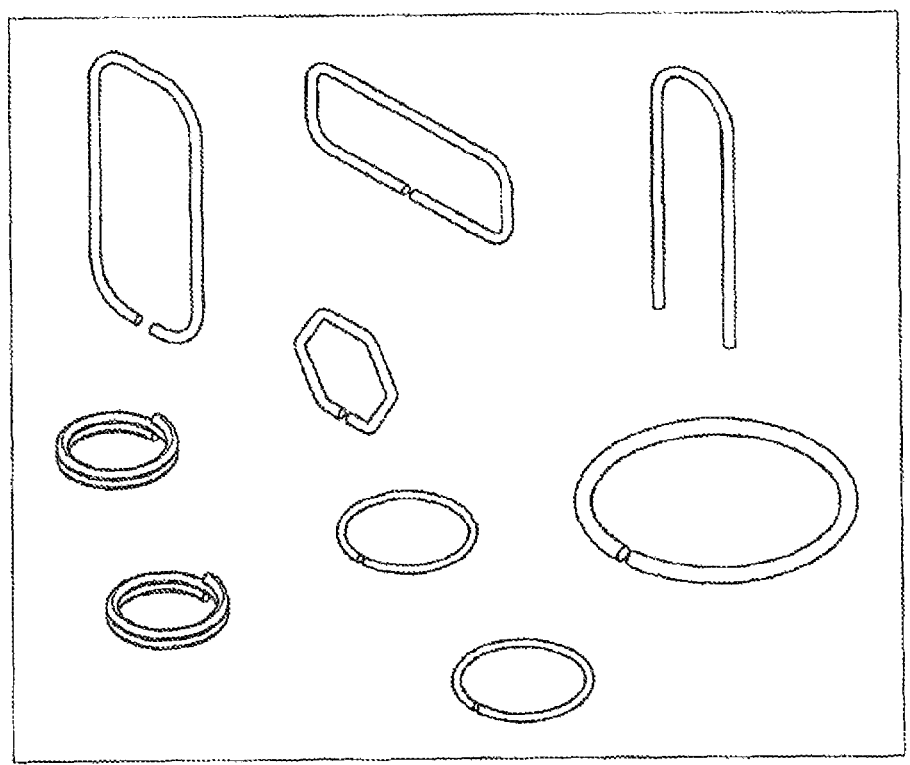
FIG. 5 illustrates various preformed, quasi-circular shapes made from the continuous length flux-coated brazing material.

In further embodiments of the method: the brazing material 1 form is a wire, strip, ring, or preformed shapes; flux coated brazing material 1 of continuous length may be formed into various form factors including wire loose coils, spools 16, preforms, rings, flat wire and strip. Sec FIG. 5 In yet other embodiments: the flux coating composition 2 has a clean burning constituent binder so that it is suitable for furnace and induction brazing and produces clean fluxing action leaving minimal flux residue, ash or carbon residue once consumed at temperatures ranging from 600 degree.-1600 degree. F., and possibly for some brazing materials 1 as high as 1700 degree. F. the dried flux coating composition 2 on said flux coated brazing material 1 is flexible, durable and does not readily crack, peel, chip, fracture or detach the surface of the brazing material 1. Further embodiments include the coating is durable enough to be fed through semi-auto or automatic braze alloy feed mechanisms.

Other objects, features and advantages of the present invention will be apparent to those skilled in the art. The invention described herein is not limited in any manner by the descriptions, definitions or characteristics of any brazing material 1 or the metals or alloys or ceramics that may be joined thereby, of any flux composition. Any brazing flux or brazing material 1 may be used for the purposes of the invention.

While the above compositions have been provided, deviations or modifications may be used. Again, the formulations of the flux coating compositions 2 described above simply define a lower limit; therefore, compositions having amounts higher than the lower limits are also expected to be effective for the purposes of the invention and so they are also encompassed within the present invention.

While preferred examples and steps of the present invention have been illustrated and described, this has been by way of illustration only and the invention should not be limited except as required by the scope of the appended claims and their equivalents.

The various tables referenced herein are set forth below:

TABLE 1

| ELASTOMES (BINDERS) | |
| --- | --- |
| Poly(propylene carbonate) | Polyurethanes |
| Poly(ethylene carbonate) | Aromatic Polycarbonates |
| Poly(alkylene carbonate) | Cellulose |
| Aliphatic Carbonates | Acrylics |
| Poly Vinyl Chlorides | |
| Latex Compounds | |
| Silicates | |
| Polyesters | |

TABLE 2

SOLVENTS

| | |
|---|---|
| Glycol Ether Acetates | Esters |
| Alcohols | Glycols |
| Polyols | Ethers |
| Alkanolamines | Ethyleneamines |
| Aromatic Solvents | Aliphatic Naphthas |
| Terpenes | Water |
| Ketones | |
| N-Methyl-2-pyrrolidone | |

TABLE 3

PLASTICIZERS

| | |
|---|---|
| Citrates | Sulfates |
| Phosphates | Phthalates |
| Adipates | Sebacate Esters |
| Polyols | Caster Oil |

TABLE 4

Brazing Materials
Headings represent the component base metal composition. Metals listed below a heading represent the brazing metals and alloys thereof that may be used to join the components.
All identified metals may be used as the base metal or in combinations to form alloys.

NICKEL & COBALT FILLER METALS: Ni, Cr, B, Si, Fe, C, P, S, Al, Ti, Mn, Cu, Zr, W, Co, Mo, Nb, Se
COPPER FILLER METALS: Cu, Ag, Zn, Sn, Fe, Mn, P, Pb, Al, Si
GOLD FILLER METALS: Au, Cu, Pd, Ni
ALUMINUM & MAGNESIUM FILLER METALS: Si, Cu, Mg, Bi, Fe, Zn, Mn, Cr, Ni, Ti, Be, Al
SILVER FILLER METALS: Ag, Cu, Zn, Cd, Ni, Sn, Li, Mn
FILLER METALS FOR VACUUM SERVICE: Ag, Au, Cu, Ni, Co, Sn, Pd, In

TABLE 5

PROPERTIES OF FLUX-COATED CONTINUOUS LENGTH BRAZING MATERIALS

Flux is present in an amount of ≥5% by weight.
Withstands mechanical pressure of up to 220 psi at between approximately 20° to 25° C. without detaching from the brazing material.
Bending Radius Range: 0.375 inches to 1 inch without the surface cracking (specific bending radius depends on particular flux coating composition 2 formulation).
May be formed into preform rings, loose coils, wound around a spool.
Coating burns back ("burn-back") when heat is removed: ≤0.125 inches (solid metal).
Absorbs ≤ approximately 1% water (by weight) at between 20-25° C.
Compatible with all color pigment or dye additives.

TABLE 6

PREFERRED ELASTOMER (BINDER) PROPERTIES

Molecular weight: 10,000-1,000,000 daltons (more preferably 150,000 to 500,000)
Glass Transition Temperature (Tg): 40°-300° F.
Tensile Strength (psi between 20°-25° C.): 500-600
Water Absorption (between 20°-25° C.): ≤5%
Decomposition Temperature: 100°-300° C.
Comprises at least 5% (by weight) of flux coating composition.

We claim:

1. A flux coating composition comprising:
   a composition paste including an elastomer solution mixed with a flux powder or a flux paste, the elastomer solution comprising:
   a binder in the amount of 10-30% by weight of the flux coating composition; and
   a solvent in the amount of at least 30% by weight of the flux coating composition;
   the composition yields no metal oxides and ≤50 ppm of carbon, ash, fumes, smoke, or other by-product contaminants when the composition is heated in a brazing operation.

2. The flux coating composition of claim 1, wherein the binder comprises:
   an acrylic resin with 1-methoxy-2-propanol-acetate; and
   a plurality of synthetic rubber compounds with at least one of butylpolybutadiene, polyisoprene, butadienes-tyrene, and polyisobutylene.

3. The flux coating composition of claim 1, wherein the composition is capable of producing a flux coating composition which, after an ambient curing operation, is sufficiently hard so as to withstand handling without a post-cure baking or hardening.

4. The flux coating composition of claim 1, wherein the flux powder or paste is at least 30% by weight of the flux coating composition.

5. The flux coating composition of claim 1, wherein the flux coating composition does not crack, peel, fracture, chip, break, or otherwise become non-continuous when a coated brazing material is bent, curved, conformed, or otherwise deformed during normal packaging, shipping, handling, storage, or use.

6. The flux coating composition of claim 1, wherein the composition is applied to a brazing material in a thickness of between 0.0005 and 0.035 inches with a tolerance of +/−0.001 of an inch.

7. The flux coating composition of claim 1, wherein the composition is applied to an exterior of a brazing material having a base metal or alloy composition of at least one of the elements of copper, silver, phosphorous, nickel, zinc, tin, cadmium, and manganese.

8. The flux coating composition of claim 1, wherein the flux coating composition is mixed to a concentration of 60% by weight solids in preparation for a coating application to a surface.

9. The flux coating composition of claim 1, wherein the flux coating composition includes 1-3% by weight acetyl tributyl citrate plasticizer.

10. The flux coating composition of claim 1, wherein the flux coating position includes 18-22% by weight aliphatic polycarbonate.

11. The flux coating composition of claim 1, wherein the flux coating composition includes 38-45% by weight solvent.

12. The flux coating composition of claim 1, wherein the flux coating composition includes 28-35% by weight brazing flux powder.

13. The flux coating composition of claim 1, wherein the flux coating composition includes 3-5% by weight acetyl tributyl citrate plasticizer.

14. The flux coating composition of claim 1, wherein the flux coating composition includes 25-30% by weight aliphatic polycarbonate.

15. A flux coating composition for a brazing material comprising:
   a non-hygroscopic flux up to 50% by weight;
   a hinder 12-30% by weight; and
   a solvent at least 30% by weight.

16. The flux coating composition of claim 15 wherein the composition yields no metal oxides and ≤50 ppm of carbon, ash, fumes, smoke, or other by-product contaminants when the composition is heated in a brazing operation.

17. The flux coating composition of claim 15 wherein the composition is applied to a brazing material in a thickness of between 0.0005 and 0.035 inches with a tolerance of +/−0.001 of an inch.

18. The flux coating composition of claim 15 wherein following an ambient curing operation, the flux coating composition withstands mechanical pressure of up to 220 psi at between 20 to 25 degrees Celsius without detaching from the brazing material.

19. The flux coating composition of claim 15 wherein the binder has a tensile strength between 500 and 600 psi between 20 to 25 degrees Celsius.

20. A flux composition used for brazing, the flux composition comprising;

a flux powder or flux paste, the flux powder or flux paste being up to 50% by weight of the flux composition;

wherein the flux powder or flux paste comprises:
  at least one of borates, fluorides, chlorides, and salts; and
  at least one of lithium, sodium, potassium, rubidium, cesium, and wherein the flux composition is applied to a brazing material, the brazing material formed into a circular, oval, or elliptical shape and comprising a base metal or alloy composition of at least one of the elements of aluminium, copper, gold, platinum, silver, phosphorous, nickel, zinc, tin, cadmium, and manganese; and wherein the flux composition melts and flows at a first temperature and the brazing material melts and flows at a second temperature, the first temperature is lower than the second temperature.

* * * * *